(12) United States Patent
Bailey et al.

(10) Patent No.: US 12,155,737 B1
(45) Date of Patent: Nov. 26, 2024

(54) DIGITAL FEATURE MONITORING AND RECOMMENDATION

(71) Applicant: International Business Machines Corporation, Armonk, NY (US)

(72) Inventors: Logan Bailey, Atlanta, GA (US); Jeremy R. Fox, Georgetown, TX (US); Suman Patra, Kolkata (IN); Zachary A. Silverstein, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/479,164

(22) Filed: Oct. 2, 2023

(51) Int. Cl.
*H04L 67/564* (2022.01)
*H04L 67/50* (2022.01)

(52) U.S. Cl.
CPC .......... *H04L 67/564* (2022.05); *H04L 67/535* (2022.05)

(58) Field of Classification Search
CPC ........................... H04L 67/564; H04L 67/535
See application file for complete search history.

(56) References Cited

U.S. PATENT DOCUMENTS

| 8,897,485 | B2 | 11/2014 | Fedorovskaya et al. | |
|---|---|---|---|---|
| 9,417,069 | B2 | 8/2016 | Gupta et al. | |
| 2015/0088955 | A1* | 3/2015 | Hendrick | H04L 67/10 709/201 |
| 2019/0164107 | A1* | 5/2019 | Upadhyay | G06Q 10/06398 |
| 2020/0226418 | A1 | 7/2020 | Dorai-Raj et al. | |
| 2021/0224750 | A1* | 7/2021 | Duan | G06F 16/9535 |
| 2021/0233094 | A1 | 7/2021 | Isaacs | |
| 2023/0004832 | A1* | 1/2023 | Sahasi | H04L 67/306 |

OTHER PUBLICATIONS ip.com, Method and System for User's Experience Aware UI Adaptation, May 29, 2022.
ip.com, System for Optimizing Use Cases Business Scenarios Based on Machine Learning, May 30, 2023.
Baum et al., A Multi-Objective Anytime Rule Mining System to Ease Iterative Feedback from Domain Experts, Dec. 23, 2018.
IBM, What is Process Mining?, 2023, https://www.ibm.com/topics/process-mining.
IBM, IBM Robotic Process Automation, 2023, https://www.ibm.com/products/robotic-process-automation.

* cited by examiner

*Primary Examiner* — Benjamin M Thieu
(74) *Attorney, Agent, or Firm* — Garg Law Firm, PLLC; Rakesh Garg; Rakesh Roy

(57) ABSTRACT

An embodiment establishes an interaction database based at least in part on interaction data representative of user engagement with a set of features of an application. The embodiment measures user engagement with each feature of the set of features. The embodiment calculates a familiarity score for each feature of the set of features based at least in part on measured user engagement. The embodiment constructs a subset of features of the set of features, wherein the subset of features is characterized by low familiarity score. The embodiment generates at least one recommendation to utilize at least one feature of the subset of features. The embodiment assesses a focal state of a user based on a focal state indicator metric. The embodiment displays the recommendation on a user device at an optimal time, wherein the optimal time is based at least in part on the focal state of the user.

20 Claims, 9 Drawing Sheets

DIGITAL FEATURE MONITORING AND RECOMMENDATION

BACKGROUND

The present invention relates generally to robotic process automation. More particularly, the present invention relates to a method, system, and computer program for digital feature monitoring and recommendation.

Robotic process automation (RPA) technology has evolved significantly over the past few years. Today, RPA systems provide significant improvement to the efficiency in performing a wide array of tasks traditionally performed by human beings over a computer. RPA technology enables the automatic performance of many repetitive tasks that previously required a human to perform, through the implementation of software robots that are designed to learn to perform various tasks, oftentimes through observation of how such tasks are successfully completed.

Today, almost every business includes completing some portion of work using one or more software applications. The more experience an individual has with a particular software application, the more accustomed that individual will be to using certain features of that application. However, at the same time, the more accustomed an individual is to using certain features of a software application, the less likely that individual is to utilize other features of that software application that the user might be less familiar with or accustomed to using. Accordingly, an individual may experience content blindness with regard to certain features of an application, especially once that individual has developed a level of mastery with that specific application.

SUMMARY

The illustrative embodiments provide for digital feature monitoring and recommendation. An embodiment includes establishing an interaction database based at least in part on interaction data received from an application, the interaction data representative of user engagement with a set of features of the application. The embodiment also includes measuring user engagement with each feature of the set of features. The embodiment also includes calculating a familiarity score for each feature of the set of features based at least in part on measured user engagement. The embodiment also includes constructing a subset of features of the set of features, wherein the subset of features is characterized by low familiarity score. The embodiment also includes generating at least one recommendation to utilize at least one feature of the subset of features. The embodiment also includes assessing a focal state of a user based on a focal state indicator metric. The embodiment also includes displaying the recommendation on a user device at an optimal time, wherein the optimal time is based at least in part on the focal state of the user.

Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
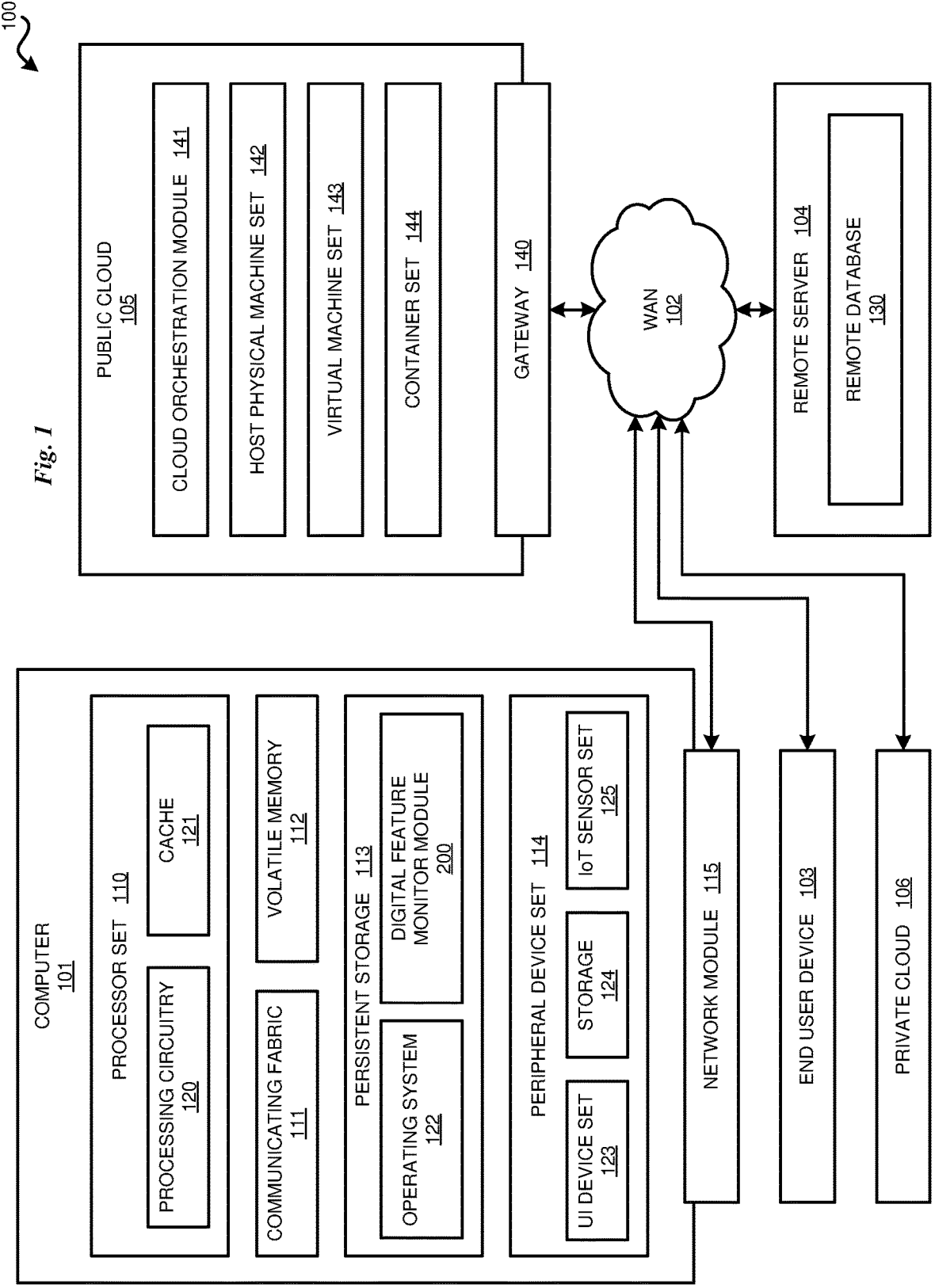
FIG. 1 depicts a block diagram of a computing environment in accordance with an illustrative embodiment.

An embodiment includes a computer-implemented method, which includes establishing an interaction database based at least in part on interaction data received from an application, the interaction data representative of user engagement with a set of features of the application; measuring user engagement with each feature of the set of features; calculating a familiarity score for each feature of the set of features based at least in part on measured user engagement; constructing a subset of features of the set of features, where the subset of features is characterized by low familiarity score; generating at least one recommendation to utilize at least one feature of the subset of features; assessing a focal state of a user based on a focal state indicator metric; and displaying the recommendation on a user device at an optimal time, where the optimal time is based at least in part on the focal state of the user. Thus, the embodiment enables digital feature monitoring and recommendation.

In another embodiment, in the computer-implemented method, the constructing a subset of features of the set of features includes comparing the familiarity score for each feature of the set of features against a threshold familiarity score, and classifying any feature that does not meet the threshold familiarity score as a low familiarity score feature. Thus, the embodiment enables a manner of low familiarity score classification.

In another embodiment, in the computer-implemented method, the recommendation includes a visual cue corresponding to the at least one feature of the subset of features. Thus, the embodiment enables a visual method of recommendation.

In another embodiment, in the computer-implemented method, the recommendation includes a pop-up notification. Thus, the embodiment enables a display method of recommendation.

In another embodiment, in the computer-implemented method, the recommendation includes a tutorial instructing how to use the at least one feature of the subset of features. Thus, the embodiment enables a tutorial method of recommendation.

In another embodiment, in the computer-implemented method, the optimal time is based at least in part on contextual data. Thus, the embodiment enables a specific manner of determining a time component.

In another embodiment, the computer-implemented method further includes removing an irrelevant feature from the subset of features. Thus, the embodiment enables reducing the subset of features.

In another embodiment, in the computer-implemented method, the focal state indicator metric is based at least in part on at least one of a click pattern, a session duration, or a feature usage. Thus, the embodiment enables a manner of computing a metric.

In another embodiment, in the computer-implemented method, interaction data representative of user engagement of the set of features of the application includes at least one of clicking a user interface button, entering text into a text-input location, or a duration of time spent on a page. Thus, the embodiment enables a manner of determining user engagement.

An embodiment includes a computer program product, which includes one or more computer readable storage media, and program instructions collectively stored on the one or more computer readable storage media, the program instructions executable by a processor to cause the processor to perform operations, the operations including establishing an interaction database based at least in part on interaction data received from an application, the interaction data representative of user engagement with a set of features of the application; measuring user engagement with each feature of the set of features; calculating a familiarity score for each feature of the set of features based at least in part on measured user engagement; constructing a subset of features of the set of features, where the subset of features is characterized by low familiarity score; generating at least one recommendation to utilize at least one feature of the subset of features; assessing a focal state of a user based on a focal state indicator metric; and displaying the recommendation on a user device at an optimal time, where the optimal time is based at least in part on the focal state of the user. Thus, the embodiment enables digital feature monitoring and recommendation.

In another embodiment, in the computer program product, the stored program instructions are stored in a computer readable storage device in a data processing system, and the stored program instructions are transferred over a network from a remote data processing system. Thus, the embodiment enables a manner of distributing the computer program product.

In another embodiment, in the computer program product, the stored program instructions are stored in a computer readable storage device in a server data processing system, and the stored program instructions are downloaded in response to a request over a network to a remote data processing system for use in a computer readable storage device associated with the remote data processing system, the computer program product further including program instructions to meter use of the program instructions associated with the request; and program instructions to generate an invoice based on the metered use. Thus, the embodiment enables a metered manner of distributing and using the computer program product.

In another embodiment, the operations further include constructing a hierarchical list containing an ordered listing of each feature of the set of features based on relative usage frequency, and where constructing a subset of features of the set of features characterized by low usage frequency is based at least in part on the hierarchical list. Thus, the embodiment enables a manner of constructing the subset of features.

In another embodiment, the operations further include removing an irrelevant feature from the subset of features. Thus, the embodiment enables a manner of reducing the subset of features.

In another embodiment, in the computer program product, the recommendation includes a visual cue corresponding to the at least one feature of the subset of features. Thus, the embodiment enables a visual manner of recommendation.

In another embodiment, in the computer program product, the recommendation includes a pop-up notification. Thus, the embodiment enables a display manner of recommendation.

An embodiment includes a computer system, which includes a processor and one or more computer readable storage media, and program instructions collectively stored on the one or more computer readable storage media, the program instructions executable by the processor to cause the processor to perform operations, the operations including establishing an interaction database based at least in part on interaction data received from an application, the interaction data representative of user engagement with a set of features of the application; measuring user engagement with each feature of the set of features; calculating a familiarity score for each feature of the set of features based at least in part on measured user engagement; constructing a subset of features of the set of features, where the subset of features is characterized by low familiarity score; generating at least one recommendation to utilize at least one feature of the subset of features; assessing a focal state of a user based on a focal state indicator metric; and displaying the recommendation on a user device at an optimal time, where the optimal time is based at least in part on the focal state of the user. Thus, the embodiment enables digital feature monitoring and recommendation.

In another embodiment, in the computer system, measuring user engagement with each feature of the set of features is accomplished via a task mining technique. Thus, the embodiment enables a technique for measuring user engagement.

In another embodiment, in the computer system, the constructing a subset of features of the set of features comprises comparing the familiarity score for each feature of the set of features against a threshold familiarity score, and classifying any feature that does not meet the threshold familiarity score as a low familiarity score feature. Thus, the embodiment enables a manner of classification of features.

In another embodiment, in the computer system, the recommendation includes at least one of a visual cue corresponding to the at least one feature of the subset of features, a pop-up notification, or a tutorial instructing how to use the least one feature of the subset of features. Thus, the embodiment enables different manners of recommendation.

Individuals with job roles that involve using a computer often become experts in certain software applications, platforms, websites that they frequently use. Accordingly, an individual may access and utilize the same application tens of times in a given day, and frequently use the same features of the application each time. The more familiar and greater expertise an individual has with a particular application, the more familiar that individual will be with certain actions, links, features, components, etc., of that application. However, there may exist certain features of that application that the individual may have very rarely used, and possibly has never used at all. An individual may greatly benefit from greater exposure to certain features of an application that the individual might use less often, to increase the individual's mastery of the application, thereby causing the individual to be more adept and skillful at using the application and all of the application's features as a whole.

There exists a need for learning which features of an application a user utilizes less often in comparison to other features of that application. Further, there exists a need to alert an individual to certain features that the individual may experience content blindness towards. Currently there is no way to provide an alert to a feature of a software application that has been measured to be less often used in comparison to one or more other features of the application. The current limitations associated with usage of current software applications discourage an individual from developing mastery over all of the features contained within a particular application.

The present disclosure addresses the deficiencies described above by providing a process (as well as a system, method, machine-readable medium, etc.) that develops a system to monitor digital feature usage and provides recommendations to utilize one or more particular digital features that have been detected to be underutilized in comparison to other digital features. Disclosed embodiments combine robotic process automation (RPA) techniques, application usage frequency contextualization, focal state determination, and one or more machine learning models to detect an underutilized feature and provide an alert to cause increased usage of the underutilized feature.

The illustrative embodiments provide for digital feature monitoring and recommendation. A feature as referred to herein includes any component of a software application, including but not limited to, a certain action, link, menu item, user interface element, etc. A software application as referred to herein includes any computer program that is engaged with by a user, including but not limited to, a desktop application, a mobile application, a website, a web-application, etc. Also, a recommendation as referred to herein includes any type of alert transmitted to a user device of an application, including but not limited to, a visual cue (e.g., outlining a feature, highlighting a feature, etc.), an auditory cue, a text-based alert, an email alert, and any other type of alert capable of being transmitted via a computer system.

As used throughout the present disclosure, the term "robotic process automation" (or simply "RPA") refers to software technology related to building, deploying, and/or managing software robots that emulate human actions performed while interacting with a digital system and/or software. RPA is often referred to as software robotics, and may include the utilization of a software robot, also referred to herein as an "RPA agent". The robot (i.e., RPA agent) in robotic process automation may run on a physical and/or virtual machine. RPA tools may possess a number of technical similarities to user interface testing tools. Accordingly, RPA tools are used to automate interactions with a UI, and may be designed to do so by repeating a set of demonstration actions performed by a user. An RPA agent may utilize input controls, e.g., keyboard and mouse controls, to take actions and execute automations. The actions taken by the RPA agent may be performed in a virtual environment without the use of a screen, whereby the RPA agent may not need a physical screen to operate, but instead may interpret a screen display electronically. In traditional workflow automation develop, a developer may produce a list of actions to automate a task and interface to the backend of the computer system using one or more application programming interfaces ("APIs") and/or a dedicated scripting language. On the other hand, an RPA system may develop an action list by observing a user perform a task in an application's UI, and then perform the task autonomously by repeating the observed task in the UI. It is contemplated that RPA may enable automation in software products even when such software products do not include APIs configurable for automation development purposes.

As used throughout the present disclosure, the term "process mining" refers to discipline of data science that includes the development of software technology related to developing techniques able to extract knowledge from event logs commonly available in an information systems. These techniques may be aimed towards discovering, monitoring, and/or improving processes in a variety of application domains. Accordingly, a process mining technique may be designed to discover, monitor and improve real processes (i.e., not assumed processes) by extracting knowledge from event logs available from one or more information systems. Examples of process mining techniques may include, but are not limited to, automated process discovery (i.e., extracting process models from an event log), conformance checking (i.e., monitoring deviations by comparing model and log), social network/organizational mining, automated construction of simulation models, model extension, model repair, case prediction, and history-based recommendations. As used throughout the present disclosure, the term "event log" refers to a collection of events used as input for process mining. It is contemplated herein that in some instances events might not to be stored in a separate log file (e.g., events may be distributed over multiple different databases). As used throughout the present disclosure, the term "event" refers to an action recorded in the event log, e.g., the start, completion, or cancelation of an activity for a particular process instance. Accordingly, process mining may be accomplished via analyzing data of an event log. Event logs may store additional information about events, and process mining techniques may use extra information such as the resource (i.e., person or device) executing or initiating the activity, the timestamp of the event, or data elements recorded with the event (e.g., the size of an order).

As used throughout the present disclosure, the term "task mining" refers to a discipline of data science that includes development of software technology related to developing techniques able to extract knowledge from user interactions with software interfaces, identify tasks, identify sequences of actions, recognize patterns of actions, etc. Accordingly, task mining tools may be designed to capture user interaction data from user interactions with software interfaces by recording mouse clicks, keyboard inputs, menu item selections, and other types of interactions. The captured user interaction data may be analyzed to identify distinct tasks, sequences of actions, user behaviors, etc., in order to understand how a user may navigate through an application to accomplished a task. Whereas process mining may be utilized for analyzing end-to-end processes within an organization to identify inefficiencies, bottlenecks, and process variations, task mining is often utilized to understand user interactions with software interfaces to improve usability and/or user experience. Accordingly, while process mining techniques may utilize data captured via event logs from various information systems to analyze processes, task mining techniques may utilize data related to user interactions via a software interface. Process mining may provide insights into how processes are executed across an organization, while task mining may provide insights into how an individual user interacts with a software interface to perform one or more tasks.

As used throughout the present disclosure, the term "content blindness" refers to an experiential phenomenon in which a person may be unable to perceive an element, component, or some content in a given domain due to a cognitive bias experienced by the user. In the domain of digital systems, content blindness may include a failure to perceive or fully understand content presented on a user interface. Content blindness may be the result of various causes, including but not limited to, poor interface design, lack off accessibility features, cognitive overload, distractions, etc. An example of content blindness may include a scenario in which a user never clicks the last menu item of an interface, due to a cognitive bias that the last item in a list is never useful. Another example of content blindness may include a scenario in which a user never clicks one or more menu items of an interface because the user has become so accustomed to only selecting certain menu items, that the user no longer perceives menu items outside of the menu items that the user is familiar with using. The example scenarios depicted are not limiting to the scope of content blindness, but rather are merely intended to provide an illustrative depiction of a scenarios where an individual may be cognitively unaware of the existence of certain interface options.

As used throughout the present disclosure, the term "focal state" refers to the cognitive state of focus of an individual. Accordingly, focal state may include a state of mind existing on a spectrum ranging from unfocused to highly focused. It is contemplated that the focal state of an individual may be ascertained by the individual's behavior and/or engagement with software application for a given period of time. Further, an individual's focal state may be ascertained by comparing a user's present behavior and/or engagement with a software application to that individual's historical behavior and/or engagement with the software application.

As used throughout the present disclosure, the term "machine learning model" (or simply "ML model") refers to a computer program configured to find patterns, makes decisions, classify data and/or generate new data based on a previously unseen dataset. As a nonlimiting example, in the context of feature recommendation, an ML model can be configured to recommend a digital feature based at least in part on a likelihood that the digital feature will be engaged with by a user. An ML model may perform such tasks by having the model trained with a particular dataset, referred to as a training dataset. The training dataset may include labeled data and/or unlabeled data. Labeled data refers to a dataset of data samples that have been labeled with a particular attribute. As a nonlimiting example, labeled data of images may include images wherein each image has been labeled as a cat, dog, bird, fish, etc. Unlabeled data refers to a dataset of data samples that have not been labeled with any particular attribute. To continue on the previous nonlimiting example, unlabeled data of images may contain objects, however the types of objects within the data samples are not known. During training of an ML model, one or more machine learning algorithms may be optimized to find certain patterns or outputs from the training dataset, depending on the desired task being performed. Further, the ML model may include or one or neural networks, including but not limited to, a neural network, a deep neural network (DNN), a convolution neural network (CNN), a recurrent neural network (RNN), a generative adversarial network (GAN), a transformer network, as well as other neural networks architectures, and/or any combination thereof. The output of the training process results in a computer program with specific rules and data structures, e.g., an ML model that is configured to perform one or more tasks that the model was trained to perform. In some embodiments, one or more ML models may be trained to perform certain tasks described herein.

Illustrative embodiments include providing a process (as well as a system, method, and computer program product) for digital feature monitoring and recommendation that includes establishing an interaction database based at least in part on interaction data received from an application, the interaction data representative of user engagement with a set of features of the application. In some embodiments, the interaction data representative of user engagement of the set of features of the application comprises at least one of clicking a user interface button, entering text into a text-input location, or a duration of time spent on a page.

Illustrative embodiments further include measuring user engagement with each feature of the set of features. Illustrative embodiments further include calculating a familiarity score for each feature of the set of features based at least in part on measured user engagement. Illustrative embodiments further include constructing a subset of features of the set of features, wherein the subset of features is characterized by low familiarity score. In some embodiments, the constructing a subset of features of the set of features comprises comparing the familiarity score for each feature of the set of features against a threshold familiarity score, and classifying any feature that does not meet the threshold familiarity score as a low familiarity score feature. In some embodiments, the process further comprises removing an irrelevant feature from the subset of features.

Illustrative embodiments further include generating at least one recommendation to utilize at least one feature of the subset of features. In some embodiments, the recommendation comprises a visual cue corresponding to the at least one feature of the subset of features. In some embodiments, the recommendation comprises a pop-up notification. In some embodiments, the recommendation comprises a tutorial instructing how to use the at least one feature of the subset of features.

Illustrative embodiments further include assessing a focal state of a user based on a focal state indicator metric. Illustrative embodiments further include displaying the recommendation on a user device at an optimal time, wherein the optimal time is based at least in part on the focal state of the user. In some embodiments, the focal state indicator metric is based at least in part on at least one of a click pattern, a session duration, or a feature usage. In some embodiments, the optimal time is based at least in part on contextual data.

Illustrative embodiments include monitoring a period of interaction of a user engaging with a software application. Illustrative embodiments further include measuring a usage frequency for each feature of a set of features of the software application. Illustrative embodiments further include determining a subset of features of the set of features that are characterized by low usage frequency. Illustrative embodiments further include providing a recommendation for one or more features of the subset of features characterized by low usage frequency. Illustrative embodiments further include task mining and/or process mining to identify trends, patterns, and details corresponding to user engagement with a software application.

Illustrative embodiments include detecting interactable assets of a client software application and task mining and/or process mining iterative usages of the software application over a period of time to calculate a familiarity score for each interactable asset. Illustrative embodiments further include contextualizing the frequency of application usage determine relevance of each interactable asset to a particular user. Further, illustrative embodiments include discovering and alerting a user to assets that the user may be content blind to based on the user's limited scope of interactions within the application. In some embodiments, illustrative embodiments incentivize a user to interact with particular assets of an application through an overlay prompt system. In some such embodiments, the system may be personalized based at least in part on iterative user feedback.

In some embodiments, providing a recommendation may include transmitting an alert and/or notification to a user device. Examples of recommendations may include, but are not limited to, highlighting a software interface component of the software interface, outlining a component of the software interface, displaying a graphic adjacent to a component of the software interface, a text-based notification appearing on the screen of client device, an e-mail notification, a text-message notification sent to a mobile device, an audio-based alert, and/or any combination thereof. In a particular embodiment, the recommendation includes generating and providing a tutorial on how to interact with one or more features of an application. In such embodiment, the tutorial may be generated via an RPA agent.

Illustrative embodiments include assessing focal state of a user of an application. In an embodiment, the focal state of a user is based in part on user engagement with an application. In an embodiment, present engagement of a user with an application may be compared to historical engagement with the application to increase the accuracy of assessing the user's current focal state while interacting with an application.

Illustrative embodiments include training a machine learning (ML) model for optimally providing a recommendation. In an embodiment, the ML model is trained based on the historical data indicative that a user may engage with a recommended feature.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as digital feature monitor module 200 that monitors engagement with features of an application, identifies a feature that is underutilized, and provides a recommendation to utilize the feature that is underutilized. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
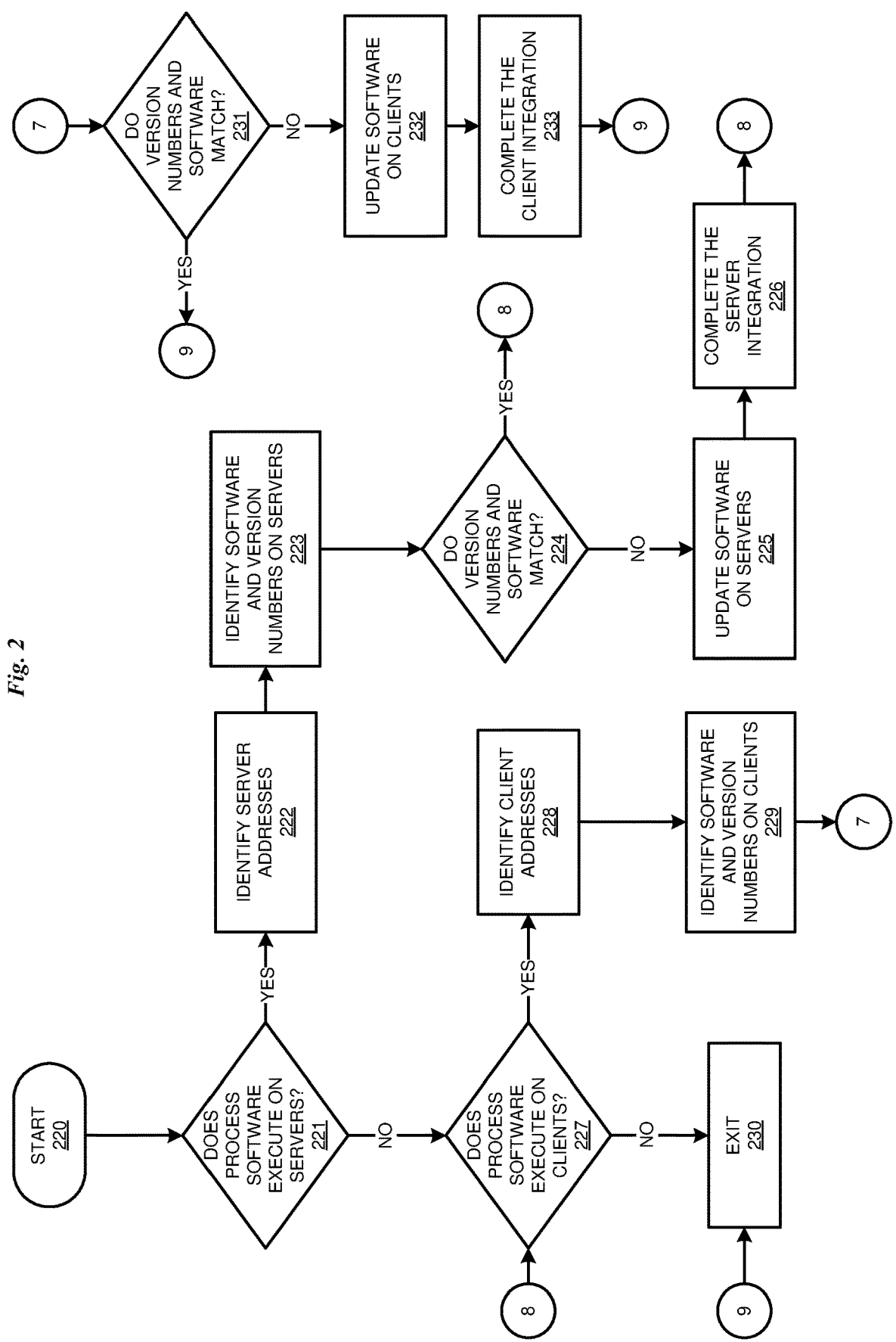
FIG. 2 depicts a flowchart of an example process for software integration in accordance with an illustrative embodiment.

With reference to FIG. 2, this figure depicts a flowchart of an example process for software integration in accordance with an illustrative embodiment. The process software including digital feature monitoring is integrated into a client, server and network environment, by providing for the process software to coexist with applications, operating systems and network operating systems software and then installing the process software on the clients and servers in the environment where the process software will function.

The integration process identifies any software on the clients and servers, including the network operating system where the process software will be deployed, that are required by the process software or that work in conjunction with the process software. This includes software in the network operating system that enhances a basic operating system by adding networking features. The software applications and version numbers will be identified and compared to the list of software applications and version numbers that have been tested to work with the process software. Those software applications that are missing or that do not match the correct version will be updated with those having the correct version numbers. Program instructions that pass parameters from the process software to the software applications will be checked to ensure the parameter lists match the parameter lists required by the process software. Conversely, parameters passed by the software applications to the process software will be checked to ensure the parameters match the parameters required by the process software. The client and server operating systems, including the network operating systems, will be identified and compared to the list of operating systems, version numbers and network software that have been tested to work with the process software. Those operating systems, version numbers and network software that do not match the list of tested operating systems and version numbers will be updated on the clients and servers in order to reach the required level.

After ensuring that the software, where the process software is to be deployed, is at the correct version level that has been tested to work with the process software, the integration is completed by installing the process software on the clients and servers.

Step 220 begins the integration of the process software. An initial step is to determine if there are any process software programs that will execute on a server or servers (221). If this is not the case, then integration proceeds to 227. If this is the case, then the server addresses are identified (222). The servers are checked to see if they contain software that includes the operating system (OS), applications, and network operating systems (NOS), together with their version numbers that have been tested with the process software (223). The servers are also checked to determine if there is any missing software that is required by the process software (223).

A determination is made if the version numbers match the version numbers of OS, applications, and NOS that have been tested with the process software (224). If all of the versions match and there is no missing required software, the integration continues (227).

If one or more of the version numbers do not match, then the unmatched versions are updated on the server or servers with the correct versions (225). Additionally, if there is missing required software, then it is updated on the server or servers (225). The server integration is completed by installing the process software (226).

Step 227 (which follows 221, 224 or 226) determines if there are any programs of the process software that will execute on the clients. If no process software programs execute on the clients, the integration proceeds to 230 and exits. If this not the case, then the client addresses are identified (228).

The clients are checked to see if they contain software that includes the operating system (OS), applications, and network operating systems (NOS), together with their version numbers that have been tested with the process software (229). The clients are also checked to determine if there is any missing software that is required by the process software (229).

A determination is made if the version numbers match the version numbers of OS, applications, and NOS that have been tested with the process software (231). If all of the versions match and there is no missing required software, then the integration proceeds to 230 and exits.

If one or more of the version numbers do not match, then the unmatched versions are updated on the clients with the correct versions 232. In addition, if there is missing required software, then it is updated on the clients 232. The client integration is completed by installing the process software on the clients 233. The integration proceeds to 230 and exits.

Figure 3:
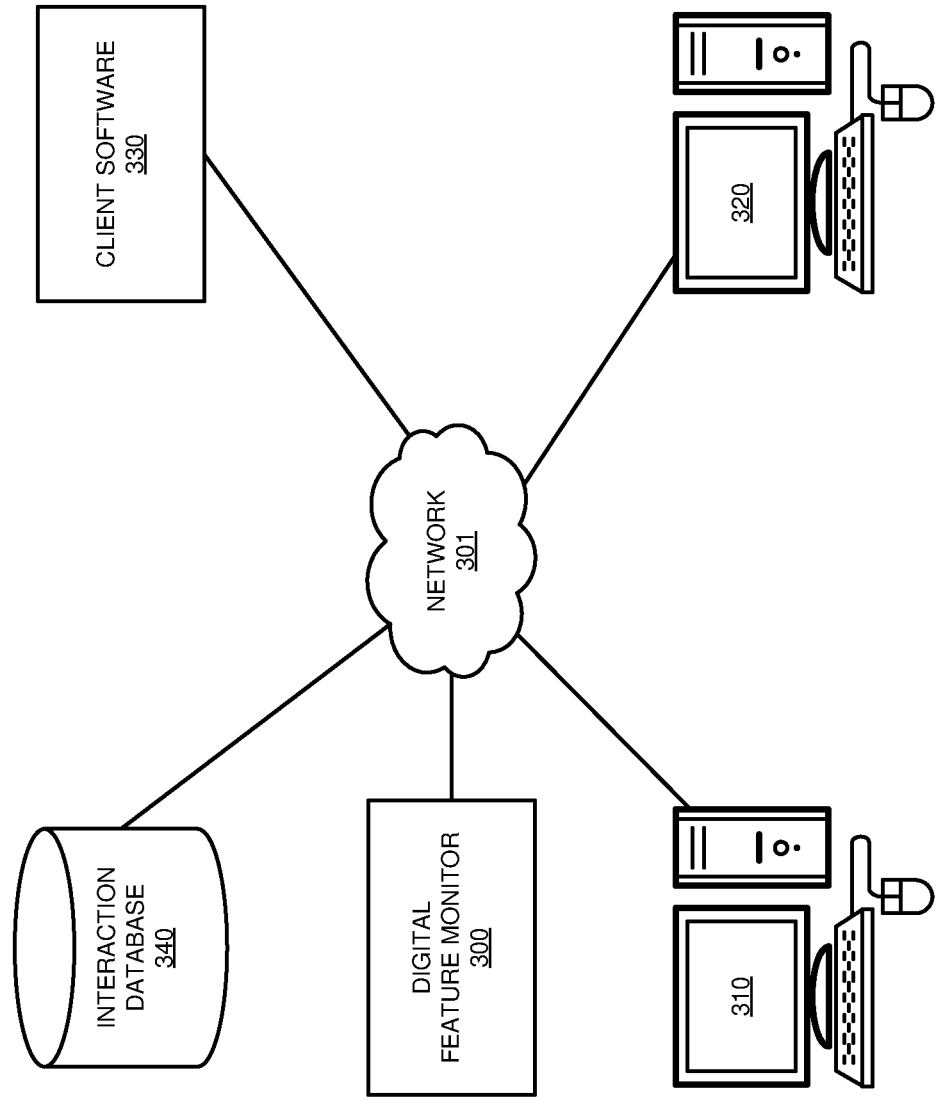
FIG. 3 depicts a block diagram of an example computing environment in accordance with an illustrative embodiment.

With reference to FIG. 3, this figure depicts a block diagram of an example computing environment in accordance with an illustrative embodiment. In the illustrated embodiment, digital feature monitor module 300 includes digital feature monitor module 200 of FIG. 1.

In the illustrated embodiment, a user device 320 is shown accessing client software 330 via network 301. In an embodiment, network 301 includes any suitable network or combination of networks such as the Internet, etc. and may use any suitable communication protocols such as Wi-Fi, Bluetooth, etc., to enable user device 320 to access client software 330. In an embodiment, client software 330 includes any type of software application, including but not limited to, a desktop application, a mobile application, a web application, a website, etc. In some embodiments, client software 330 is stored on a remote storage device (not shown). In some other embodiments, client software 330 is stored on a non-transitory computer readable medium of user device 320. User device 320 may include any suitable computing device, including but not limited to, a desktop computer, a laptop, a tablet, a smartphone, etc.

In the illustrated embodiment, a digital feature monitor module 300 is shown. In an embodiment, the digital feature monitor module 400 is a software module configured to monitor interaction and/or engagement with client software 330, analyze interaction and/or engagement with client software 330 to determine one or more underutilized features of client software 330 based on the interaction session data captured during monitoring, generate a recommendation to utilize the one or more underutilized features, and transmit and display the recommendation at an optimal time. In an embodiment, the optimal time is based at least in part on a focal state of a user. In an embodiment, the optimal time includes a focal state indicating a focused mental state. In another embodiment, the optimal state includes a focal state indicating an un-focused mental state. In an embodiment, the digital feature monitor module 300 determines a focal state corresponding to a user of client device 330 based on interaction session data collected by digital feature monitor 300. In an embodiment, the digital feature monitor module utilizes one or more task mining techniques and/or process mining techniques to collect data related to user interaction and/or engagement during an interaction session.

In an embodiment, digital feature monitor module 300 stores interaction data on interaction database 340. In an embodiment, interaction database 340 stores a corpus of user actions taken by one or more users accessing client software 330. In an embodiment, digital feature monitor module 300 generates, transmits, and/or displays recommendations and/or alerts to client device 320 based at least in part on historical interaction data stored on interaction database 340. In the illustrated embodiment, administrative device 310 enables a person having suitable administrative privileges to modify one or more parameters and/or features associated with digital feature monitor module 300.

Figure 4:
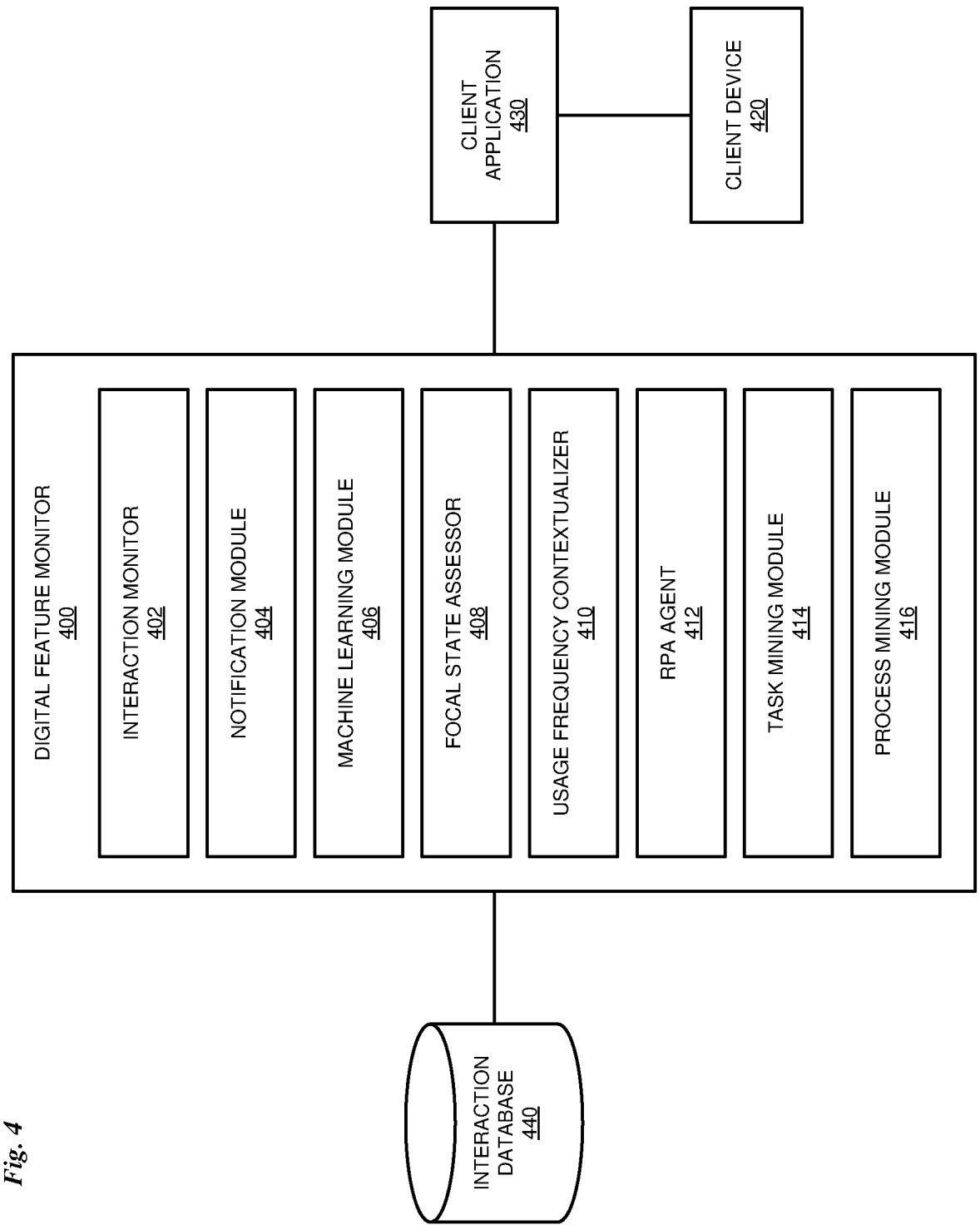
FIG. 4 depicts a block diagram of an example digital feature monitor module in accordance with an illustrative embodiment.

With reference to FIG. 4, this figure depicts a block diagram of an example digital feature monitor module in accordance with an illustrative embodiment. In the illustrated embodiment, the digital feature monitor module 400 includes digital feature monitor module 200 of FIG. 1, and/or digital feature monitor module 300 of FIG. 3. In the illustrated embodiment, digital feature monitor module 400 integrates with client application 430 which may be accessed and engaged with by a user via client device 420. In the illustrated embodiment, client application 430 includes client application 330 of FIG. 3 and client device 420 includes client device 320 of FIG. 3.

In the illustrated embodiment, digital feature monitor module 400 is a software module. In the illustrated embodiment, digital feature monitor module 400 includes an interaction monitor module 402, a notification module 404, a machine learning module 406, a focal state assessor module 408, a usage frequency contextualizer module 410, an RPA agent module 412, a task mining module 414, and a process mining module 416. In alternative embodiments, the digital feature monitor module 400 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the interaction monitor module 402 is a software module. In an embodiment, the interaction monitor module 402 monitors user actions and interactions taken across client software 430. In an embodiment, the interaction monitor module 404 utilizes RPA agent 416 to monitor a user's actions and interactions with the user interface of client application 430. In an embodiment, the interaction monitor module 404 may initiate a monitoring session, during which the RPA agent 416 monitors a user's actions for a predetermined period of time to obtain a user interaction session. Accordingly, the user interaction session may include any number of actions taken by a user during the monitoring session. In an embodiment, the user may initiate a monitoring session via the interaction monitor module 402. In some other embodiments, the interaction monitor module 402 monitors user actions and interactions with the user interface of client application 430 continuously, and may automatically begin monitoring the user's actions and interactions upon detection of any user action or engagement with the client application 430. In an embodiment, the interaction monitor module 402 initiates learning upon detection of one or more actions stored in the action corpus.

In an embodiment, interaction monitor module 402 collects data related to user engagement of one or more components of a software interface of client application 430. Further, interaction monitor module 402 may construct a hierarchical list of components, wherein the hierarchical list may be organized according to user engagement corresponding to each component of a software interface. For example, the most frequently clicked or otherwise used component may be first on the hierarchical list of components, whereas the least frequently used component (including any component that has never been clicked/used) may be last on the list. The hierarchical list of components based on user engagement may be used in part to determine a subset of components of the software interface for which a recommendation may be generated, transmitted, and/or displayed on client device 420.

In the illustrated embodiment, notification module 404 is a software module that is configured to generate, transmit, and/or display a recommendation and/or alert to user device 420 based at least in part on interaction data stored on interaction database 440. Notification module 404 may be configured to generate a variety of types of notifications, recommendations, alerts, etc., including but not limited to, highlighting a software interface component of the software interface of client application 430, outlining a component of the software interface of client application 430, displaying a graphic adjacent to a component of the software interface (e.g., arrow pointing to the component, exclamation mark next to the component, etc.), a text-based notification appearing on the screen of client device 420, an e-mail notification, a text-message notification sent to a mobile device, an audio-based alert, and/or any combination thereof.

In the illustrated embodiment, machine learning module 406 is a software module that is configured to provide an ML model for optimizing user engagement with one or more underutilized components. In the illustrated embodiment, machine learning module 406 may include a model training module, the model training module including a data preparation module, algorithm module, training engine, and a machine learning model. In alternative embodiments, the model training module can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the model trainer generates a machine learning model based on an algorithm provided by algorithm module. In an embodiment, the algorithm module selects the algorithm based on one or more known machine learning algorithms. In an embodiment, model trainer includes a training engine that trains the machine learning model using the training dataset. In some embodiments, the training dataset includes historical interaction data and recommendation click-through data for training an ML model to predict an optimal time to provide a recommendation to a user.

In the illustrated embodiment, focal state assessor module 408 is a software module configured to assess the focal state of a user interacting with client application 430 based at least in part on a series of actions indicative of user engagement with the client application 430. In an embodiment, the focal state assessor module 408 defines a plurality of possible focal states that may be attributed to a particular user. Examples of a focal state may include, but are not limited to, "focused", "un-focused", "fully engaged", "semi-engaged", "not engaged", "distracted", "bored", "frustrated", "away from keyboard". In an embodiment, the focal state assessor 408 measures one or more focal state indicator metrics. Examples a focal state indicator metric may include but is not limited to, interaction frequency, click-through rate, scrolling and/or swiping patterns, time spent on specific features, time spent on specific pages, and/or user feedback via a survey or in-app feedback form. In an embodiment, the focal state assessor module 408 collects data relevant to the one or more focal state indicator metrics. In an embodiment, the focal state assessor utilizes task mining module and/or process mining module to collect data relevant to the one or more focal state indicator metrics. In an embodiment, the data collected relevant to a focal state indicator metrics may include both explicit and implicit signals of the user's focal state. Explicit signals may include user feedback or self-reported states. Implicit signals can be derived from interactions with the application, such as click patterns, session duration, feature usage, etc. In an embodiment, the focal state assessor module 408 segments interaction data into particular focal states. For example, a duration of use exceeding a certain predetermined period of time of a particular feature may be considered as indicative of a "fully engaged" focal state. In an embodiment, the focal state assessor module 408 includes one or more thresholds or criteria for classifying a particular user focal state. For example, if a user spends more than 10 minutes on a particular page, the focal state may be classified as "fully engaged".

In the illustrated embodiment, usage frequency contextualizer module 410 is a software module configured to collect data related to a surrounding context of a user engagement with client application 430. In an embodiment, the usage frequency contextualizer module 410 collects contextual data, including, but not limited to, device information, network connection, time of day, day of the week, location data, user profile data, application usage history data, application version, notification history, user contextual data, user engagement history across multiple applications, biometric data, environmental data, etc.

In the illustrated embodiment, RPA agent module 414 is a software module that includes an RPA agent configured to perform a variety of tasks, as disclosed herein. In an embodiment, RPA agent 414 may be configured to generate a guided tutorial showing how to utilize a particular interface component. For example, RPA agent module 412 may be configured to click on a menu item to reveal a drop down menu that a user has never engaged with. As another example, RPA agent module 412 may be configured to demonstrate how to enter text into and utilize a chatbot feature of an interface to provide more useful results.

In an embodiment, the digital feature monitor module 400 identifies features of an application that may be underutilized, and provides one or more recommendations to encourage a user to interact with the underutilized features while the user is experiencing a particular focal state. For example, in an embodiment, the underutilized feature recommendation may be recommended while the user's focal state is not fully engaged. In another embodiment, the underutilized feature recommendation may be recommended while the user's focal state is fully engaged. It is contemplated that in some scenarios it may be preferable to provide a recommendation while the user is focused, while in other scenarios it may be preferable to provide a recommendation while the user is unfocused.

In an embodiment, the digital feature monitor module 400 defines the focal states that will trigger recommendations for interacting with underutilized features. In an embodiment, the digital feature monitor module 400 gathers data on user interactions with the application, including timestamps, feature usage, user feedback, etc. In an embodiment, digital feature monitor module 400 utilize a machine learning model to assess the user's focal state based on the collected data and/or for providing a recommendation at an optimal time.

In an embodiment, the digital feature monitor module 400 analyzes the historical data to determine which features are underutilized by a user. In an embodiment, underutilization may be identified in part according to utilization metrics including but not limited to, engagement rates, time spent, or click-through rates with regard to one or more features. In an embodiment, the digital feature monitor module 400 establishes rules or criteria for recommending underutilized features to a user based on the user's focal state. For example, if a user has spent a certain amount of time in the "Not Fully Engaged" state, this may cause the the digital feature monitor module 400 to trigger a recommendation. In an embodiment, the digital feature monitor module 400 tailors recommendations based on the user's historical behavior and preferences. The digital feature monitor module 400 may consider the user's past interactions and the specific underutilized features that align with their interests and/or job specification. In an embodiment, the digital feature monitor module 400 determines how and when the recommendations will be presented to the user. Examples of recommendation notifications may include, but are not limited to, in-app notifications, pop-ups, or subtle visual cues within the application to suggest interacting with the underutilized feature. In an embodiment, the digital feature monitor module 400 continuously monitors user interactions and focal states to adapt the recommendation process. As user behavior and preferences change, the recommendation engine may be updated to remain effective. In an embodiment, the digital feature monitor module 400 may include defined key performance indicators (KPIs) to measure the success of the recommendation system. These KPIS might include, but are not limited to, increased feature engagement, higher session durations, and/or improved user satisfaction. In an embodiment, the digital feature monitor module 400 iterates the recommendation process based on the insights gathered from user feedback and performance metrics.

Figure 5:
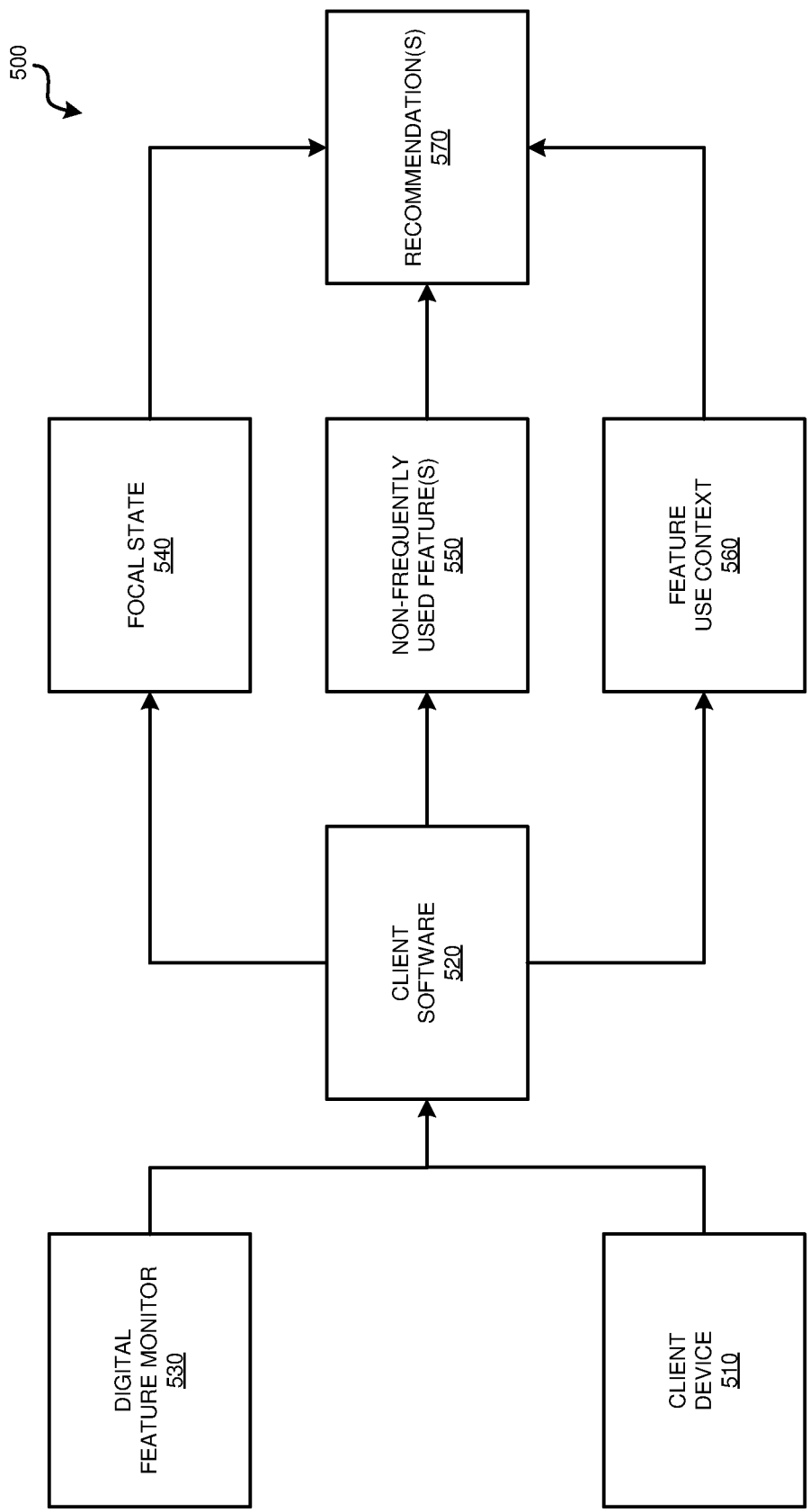
FIG. 5 depicts a block diagram of an example process for generating and providing a recommendation to utilize an application feature in accordance with an illustrative embodiment.

With reference to FIG. 5, this figure depicts a block diagram of an example process for generating and providing a recommendation to utilize an application feature in accordance with an illustrative embodiment. In the illustrated embodiment, digital feature monitor module 530 includes digital feature monitor module 200 of FIG. 1, digital feature monitor module 300 of FIG. 3, and/or digital feature monitor module 400 of FIG. 4.

In the illustrated embodiment, a client device 510 accesses client software 520 to enable a user to interact and engage with client software 520. The digital feature monitor 530 is configured to monitor user interaction, collect user interaction data based on user interaction, analyze user interaction data, and perform a various other actions as described herein. Accordingly, based on more or more actions taken by a user interacting with client software 520 via client device 510, the digital feature monitor 530 is enabled to assess a focal state 540 of a user, determine one or more non-frequently used features 550, as well as provide feature use context 560 related to the usage of particular features of client software 520.

In the illustrated embodiment, the process 500 determines a focal state 540 of a user based at least in part on user interaction data collected by digital feature monitor 530. In the illustrated embodiment, the process 500 determines one or more non-frequently used features of client software 520 based at least in part on interaction data collected by digital feature monitor 530. In the illustrated embodiment, the process 500 determines a feature use context 560 based at least in part on contextual data collected by digital feature monitor module 530. Accordingly, the process 500 correlates the contextual data to the user interaction data to determine a feature use context 560.

In the illustrated embodiment, the process 500 generates one or more recommendations 570 to display on client device 510 related to the usage of client software 520. In an embodiment, the process 500 may be performed iteratively based on insights gathered from user feedback and performance metrics. In an embodiment, process 500 may generally comprise the following steps. Digital feature monitor module 530 integrates with client software 520. Once integrated with client software 520, digital feature monitor module detects interactable assets of client software 520, and collects data related to actions a user performs over client software 520 using client device 510. In an embodiment, digital feature monitor module 530 employs a task mining process to task mine iterative uses of the features of the client software 520 over a period of time. In an embodiment, the period of time may be predetermined. For example, the period of time may be 1 hour, 8 hours, 24 hours, etc. It is contemplated herein that the period of time may include any length of time. In another embodiment, the task mining process may run indefinitely whenever client software is accessed by a user. In another embodiment, the task mining process may be initiated upon detection of an interaction with an interactable asset of client software 520.

In an embodiment, digital feature monitor module 530 determines a familiarity score for each feature of the client software 520. In an embodiment, the digital feature monitor module 530 provides an alert/recommendation based on the familiarity score of an application feature. In an embodiment, if the familiarity score of an application feature does not meet a predetermined threshold, then the digital feature monitor module 530 may classify the application feature as a non-frequently used feature 550, and will alert the user and/or provide a recommendation 570 to interact with the one or more elements that fail to meet the predetermined threshold, i.e., non-frequently used feature(s) 550. In an embodiment, the recommendation 570 may be based at least in part on contextual data related to user interaction. Examples of contextual data may include, but are not limited to, profile data of a user, including job role details corresponding to the user. Accordingly, based on job role details of a user, it may be the case that a particular user may not benefit from increased familiarity with certain features of the application. Accordingly, the contextual data may enable the process 500 to contextualize the frequency of application feature usage to the individual user to determine relevance and recommendations 570. In an embodiment, certain features and/or content may be blocked from the process 500 for the sake of generating one recommendations 570. Accordingly, a user or another individual with sufficient privileges may explicitly state particular content or create a category of subject matter that may be excluded from the recommendation process. For example, certain topics, subjects, words, phrases, etc. may be excluded from being recommended to the user.

Figure 6A:
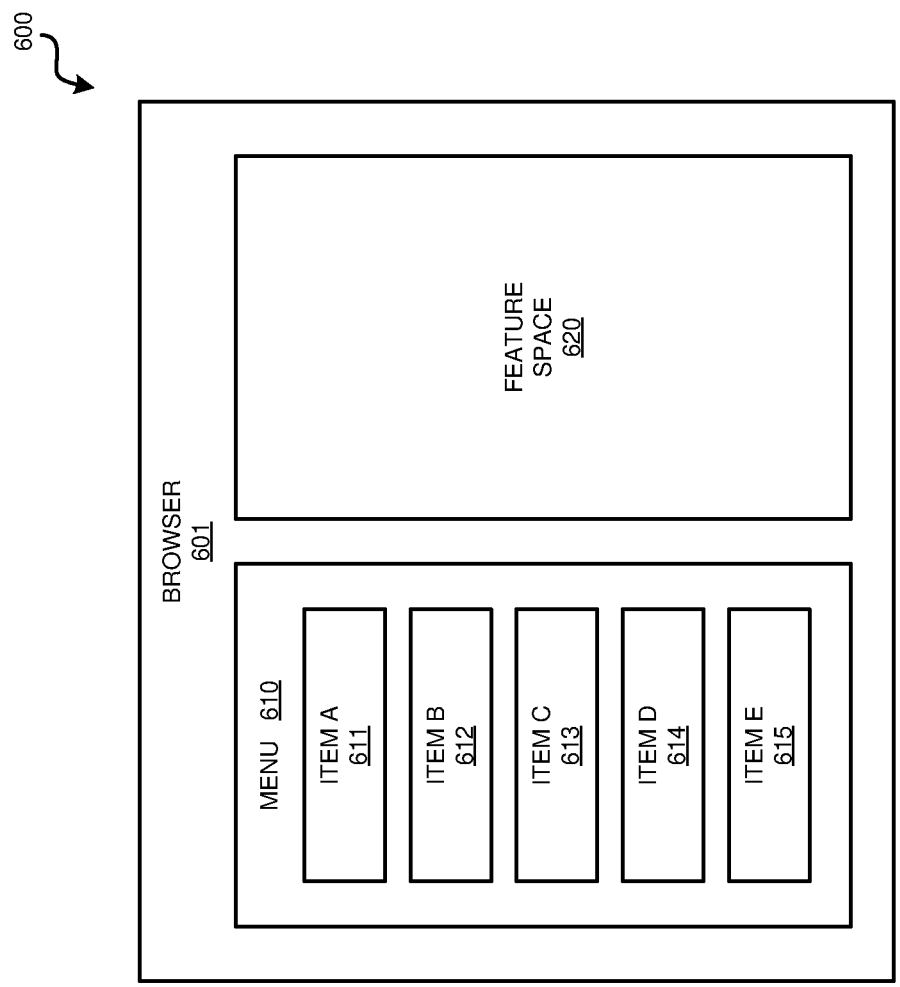
FIG. 6A depicts a block diagram of an example software application in accordance with an illustrative embodiment.

With reference to FIG. 6A, this figure depicts a block diagram of an example software application in accordance with an illustrative embodiment. In an embodiment, the software application 600 includes a web-site. In the illustrated embodiment, the software application 600 is shown including a browser 601, a user interface 610, and a feature space 620.

In the illustrated embodiment, the user interface 610 is a menu, including a plurality of menu items, including item A 611, item B 612, item C 613, item D 614, and item E 615. In the illustrated embodiment, the feature space 620 represents a web-page of the web-site accessed upon selection of particular menu item of user interface 610. Suppose a scenario in which a user frequently selects item A 611, item B 612, item C 613, and item D 614 to navigate to certain pages of the website, but rarely, or perhaps never, selects item E 615. In such a scenario, it may be the case that the user experiences content blindness with regard to item E 615. Accordingly, it may be the case that the user is already very familiar with the application 600, and the user does not stray from his usual interactions with items A 611, B 612, C 613, and D 614. Further, it may also be the case that since item E 615 is the last item on user interface 610, the user assumes that item E 615 does not provide any useful functionality for the user. In an embodiment, the digital feature monitor module described herein monitors a user's interactions with application 600 to determine which features of application 600 the user interacts with, frequency of interaction with each feature, and the context surrounding the interactions.

Figure 6B:
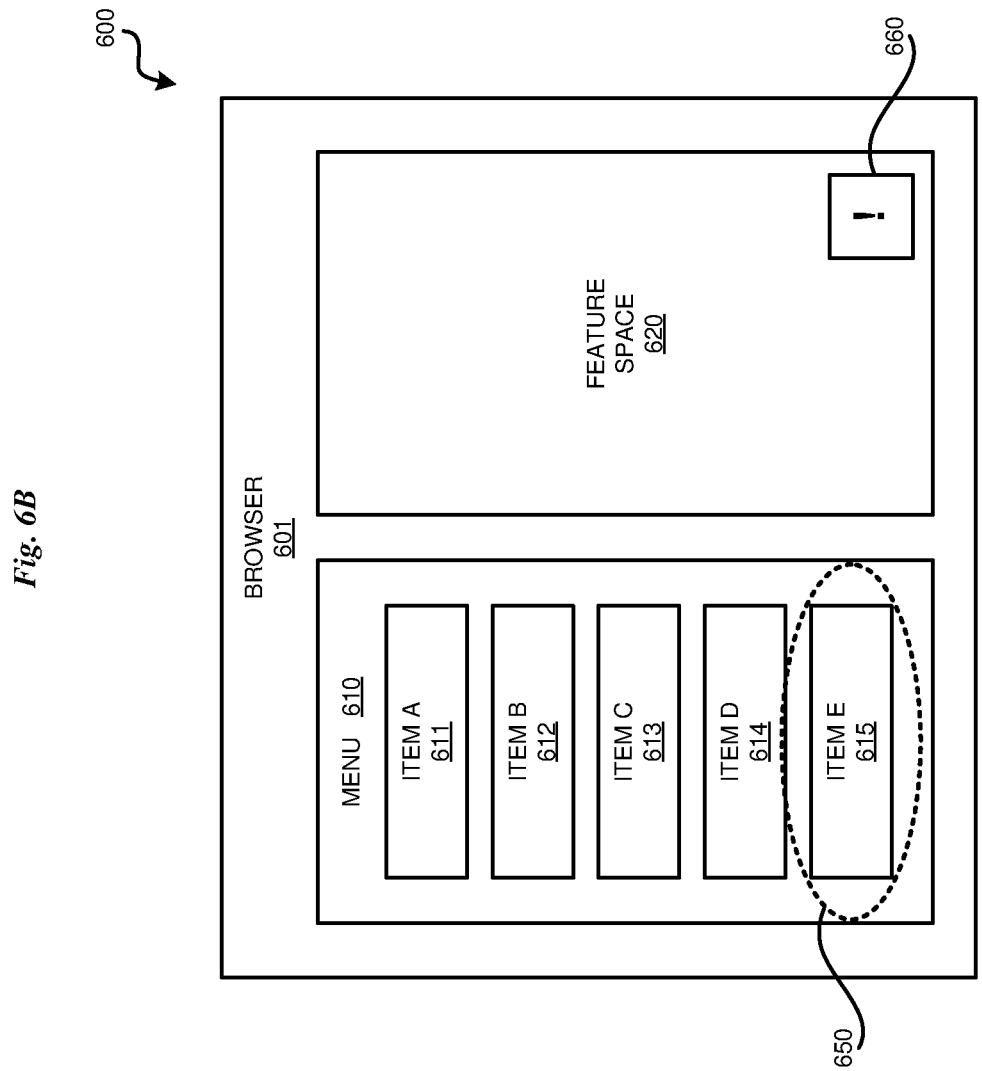
FIG. 6B depicts a block diagram of an example software application integrated with a digital feature monitor module in accordance with an illustrative embodiment.

With reference to FIG. 6B, this figure depicts a block diagram of an example software application integrated with a digital feature monitor module in accordance with an illustrative embodiment. In the illustrated embodiment, application 600 includes the same application as application 600 of FIG. 6A. In comparison to application 600 of FIG. 6A, application 600 of FIG. 6B includes the integrated digital feature monitor module, as disclosed herein. In the illustrated embodiment, item E 615 has been identified as an underutilized feature. The digital feature monitor module disclosed may recommend to the user to interact with item E by generating and displaying a recommendation notification on the screen of the user's device. As depicted in FIG. 6B, item E 615 is shown with a feature outline visual cue 650 around item E to encourage a user to select item E 615. Further, as depicted in FIG. 6B, a pop-up notification 660 is shown in the feature space 620 of the application browser 601, wherein the pop-up notification may include a suggestion to interact with item E 615. In an embodiment, selecting the pop-up notification 660 causes the digital feature monitor module to initiate a tutorial teaching how to utilize one or more features associated with item E 615. The use of the above examples in non-limiting, and it is contemplated that the recommendation, notification, alert, etc. may include at least any of the recommendation/notification/alert types that are disclosed herein.

Figure 7:
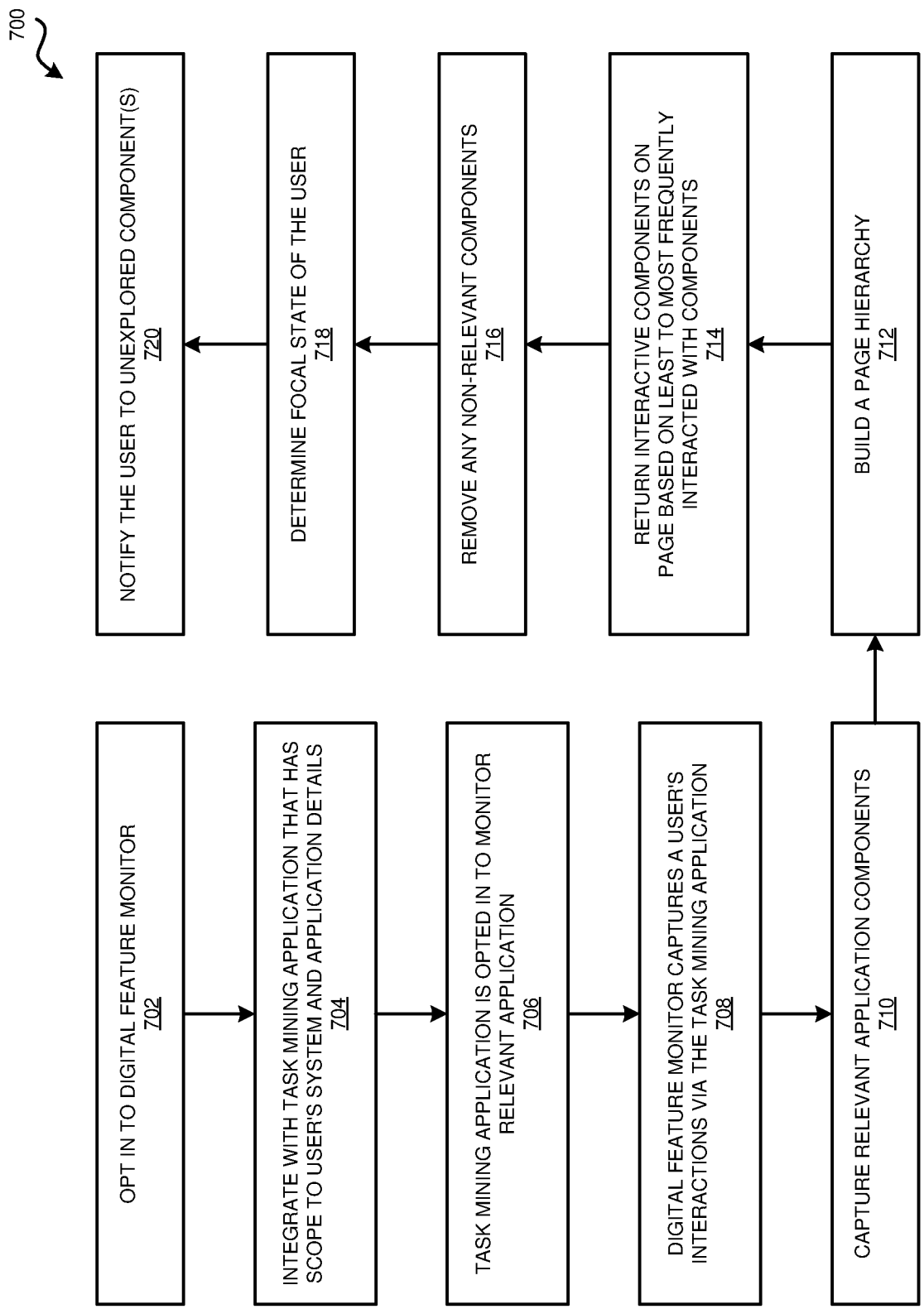
FIG. 7 depicts a flowchart of an example process for monitoring user engagement with an application and providing an alert to utilize one or more features of an application in accordance with an illustrative embodiment.

With reference to FIG. 7, this figure depicts a flowchart of an example process for monitoring user engagement with an application and providing an alert to utilize one or more features of an application, in accordance with an illustrative embodiment. In a particular embodiment, the digital feature monitor module 200 of FIG. 1, the digital feature monitor module 300 of FIG. 3, and/or the digital feature monitor module 400 of FIG. 4 carries out the process 700.

At step 702, the process requests permission to opt in to utilization of the digital feature monitor application. In an embodiment, the digital feature monitor application includes a task mining application configured to monitor, collect, and analyze data related to user engagement with features of an application. In an embodiment, the task mining application monitors, collects, and analyzes actions a user takes over a software interface of an application. Examples of one or more actions a user takes over a software application may include, but are not limited to, clicking a button, selecting a menu item, entering text into a text-input box or form, etc. At step 704, the process integrates the task mining application of the digital feature monitor application into a particular client software application. Accordingly, the task mining application is authorized to the a scope of a client device on which the client software accessed or deployed, as well as the software application's details. Accordingly, at step 704 the process may include integrating with a user's local operating system and any necessary application privileges, which may enable the task mining application to perform application inspection, discovery, and/or detection of relevant application features such as software interface components.

At step 706, the process requests permission to opt in to utilization of the task mining application for a particular client software application. The particular client software application includes any software application that may be investigated with respect to user engagement with said software application. In an embodiment, the process notifies a user that the task mining process will be initiated and that certain monitoring and interaction related tasks will take place over the user's computer system. In an embodiment, step 706 is performed automatically, wherein the process determines the relevant applications, websites, etc. to monitor. In another embodiment, a user manually flags particular relevant sites, applications, traffic, or other components to monitor.

At step 708, the digital feature monitor application captures a user's interactions via the task mining application. In an embodiment, step 708 likewise includes capturing a user's interactions via a process mining application as well. Accordingly, at step 708, the process begins interactively performing task mining and/or process mining to monitor user and/or process level information. The process may monitor application traffic patterns, click through patterns, backend log files, user interaction information, etc. The process may also include video and screen shot recording, as well as cursor and click monitoring.

At step 710, the process finds all application components of a client software application, including but not limited to, clickable elements and links. In an embodiment, the process finds all the clickable elements, links, etc. via a C#or Form Builder application, or any other known libraries. In an embodiment, process finds all the clickable elements, links, etc. the based on identifying one or more HTML elements or Javascript elements, such as for example, "OnClick" or <button> tag name. The components of step 708 that have been captured are iteratively stored. In an embodiment, the components may be stored locally on a user's computer system. In another embodiment, the components may be stored on cloud-based storage. In another embodiment, the components may be stored on a dedicated database of a computer server system. Relevant application components may include any features that are included in a software application. Examples of features of a software application may include, but are not limited to, user interface elements, links, pages, software tools, etc.

At step 712, the process builds a page hierarchy based on user engagement. Accordingly, based on the frequency of the user clicking certain elements, visiting certain sites, links, pages, etc., the process constructs an ontology of a user's most frequently visited components from a top-down view. In some embodiments, the page hierarchy may be constructed in traditional order, wherein most frequently used components are at the top, while the least frequently used components are at the bottom. In some other embodiments, page hierarchy may be constructed in reverse order, wherein most least frequently used components are at the top, while the most frequently used components are at the bottom. It is contemplated herein the process may take into account details including breadcrumbs, visit count, page title, as well as other details. In an embodiment, the process clusters data collected via by mining the above-mentioned sources. By clustering these data, the process may categorize the data into different groups. In this way, the process may develop an ontological model consisting of frequency of interaction with interface elements, as well as frequency of sites or pages the user visits. Further, in an embodiment, the process measures the semantic distance between sites/links/pages and the visit counts using the ontological model. At step 714, the process returns a list of interactive components based on frequency of utilization of said interactive components. In an embodiment, the process returns a set of identified components with least and most click throughs, interactions, hovers, and other components by the user.

At step 716, the process removes any non-relevant components. Accordingly, the process may cleanse the list of interactive elements by eliminating any based on pre-defined or user relevant rules and roles. For example, removing any non-relevant components may include components such as the "about us" link or the "copyright" link at the bottom of a page or application.

At step 718, the process determines a focal state of the user. Accordingly, the process gauges the user's current focal state to understand the user's current mindset. It is contemplated herein that some scenarios may prefer the user with high attentiveness, while in some other scenarios an optimal time to engage the user when may be when the user is not performing a high level of interaction or high variety instance.

At step 720, the process notifies the user to one or more unexplored components. In an embodiment, the user is notified to the elements and provided a prompting or alert and/or an overlay on the least interacted elements so the user knows and/or becomes encouraged to explore said elements. In some embodiments, the alert may encode the distance between the user's current focal state and the user's level of participation with the alert. In an embodiment, the distance between the user's current focal state and the user's level of participation may be used to train a machine learning model to provide an alert at an optimal time. Further, it is contemplated herein that the process may be further improved through explicit feedback from a user, and the user feedback may likewise be used provide an alert at an optimal time.

Figure 8:
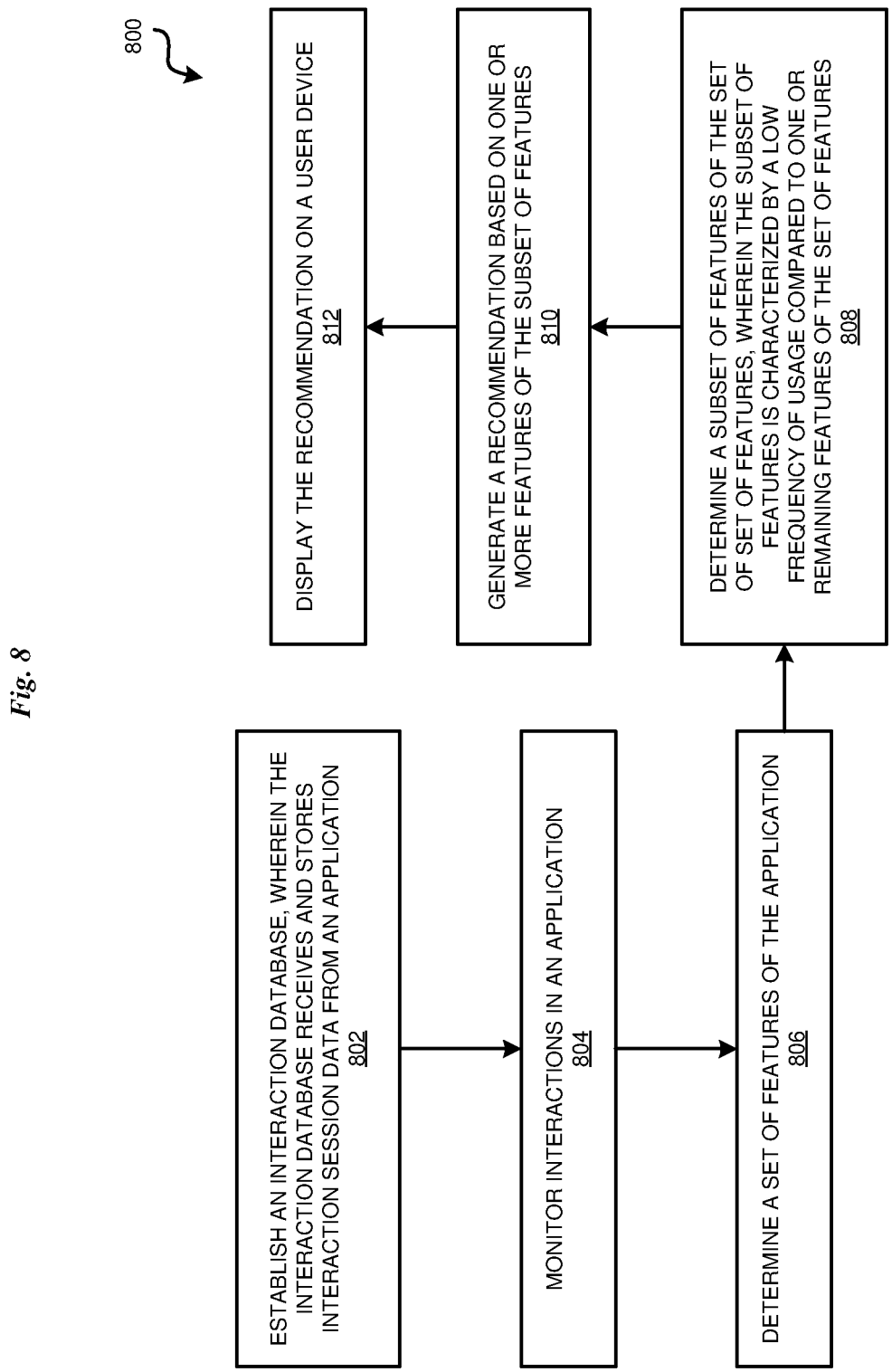
FIG. 8 depicts a flowchart of an example process for monitoring user engagement with an application and providing a recommendation to utilize one or more features of the application in accordance with an illustrative embodiment.

With reference to FIG. 8, this figure depicts a flowchart of an example process for monitoring user engagement with an application and providing a recommendation to utilize one or more features of the application, in accordance with an illustrative embodiment. In a particular embodiment, the digital feature monitor module 200 of FIG. 1, the digital feature monitor module 300 of FIG. 3, and/or the digital feature monitor module 400 of FIG. 4 carries out the process 800.

At step 802, the process establishes an interaction database. In an embodiment, the interaction database receives and stores interaction session data from a software application. The software application may include any type of software application, including but not limited to, a desktop application, a mobile application, a web-site, a web-application, etc.

At step 804, the process monitors interactions taken over the application. In an embodiment, a task mining and/or process mining technique is utilized to monitor and collect one or more actions taken over the application. Examples of actions that may be collected may include, but are not limited, interactions with a user interface, including but not limited to, clicking a link, selecting a menu item, entering text into a text-input location, etc. Further, interaction session data may also include a duration of time spent on a particular website, page, feature, etc.

At step 806, the process determines a set of features of the application. Examples of features may include, but are not limited to, user interface elements, pages, links, forms, tools, as well as any other components of an application. At step 808, the process determines a subset of features of the set of features, wherein the subset of features is characterized by a low frequency of usage compared to one or more remaining features of the application. In an embodiment, the process further determines a familiarity score for each feature of the set of features, and the subset of features may include features that are characterized by a low familiarity score compared to other features of the set of features. In an embodiment, distance between familiarity score of each feature may be used to determine a threshold familiarity score, such that any feature that fails to meet the familiarity score may be classified as a low-familiarity score feature.

At step 810, the process generates a recommendation to utilize a feature of the subset of features. Examples of a recommendation may include, but are not limited to, any type of alert transmitted to a user device of an application, such as a visual cue (e.g., outlining a feature, highlighting a feature, etc.), an auditory cue, a text-based alert, an email alert, and any other type of alert capable of being transmitted via a computer system. At step 812, the recommendation is displayed on a client device.

What is claimed is:

1. A computer-implemented method comprising:
establishing an interaction database based at least in part on interaction data received from an application, the interaction data representative of user engagement with a set of features of the application;
measuring user engagement with each feature of the set of features;
calculating a familiarity score for each feature of the set of features based at least in part on measured user engagement;
constructing a subset of features of the set of features, wherein the subset of features is characterized by low familiarity score;
generating at least one recommendation to utilize at least one feature of the subset of features;
assessing a focal state of a user based on a focal state indicator metric; and
displaying the recommendation on a user device at an optimal time, wherein the optimal time is based at least in part on the focal state of the user.

2. The computer-implemented method of claim 1, wherein the constructing a subset of features of the set of features comprises comparing the familiarity score for each feature of the set of features against a threshold familiarity score, and classifying any feature that does not meet the threshold familiarity score as a low familiarity score feature.

3. The computer-implemented method of claim 1, wherein the recommendation comprises a visual cue corresponding to the at least one feature of the subset of features.

4. The computer-implemented method of claim 1, wherein the recommendation comprises a pop-up notification.

5. The computer-implemented method of claim 1, wherein the recommendation comprises a tutorial instructing how to use the at least one feature of the subset of features.

6. The computer-implemented method of claim 1, wherein the optimal time is based at least in part on contextual data.

7. The computer-implemented method of claim 1, further comprising removing an irrelevant feature from the subset of features.

8. The computer-implemented method of claim 1, wherein the focal state indicator metric is based at least in part on at least one of a click pattern, a session duration, or a feature usage.

9. The computer-implemented method of claim 1, wherein interaction data representative of user engagement of the set of features of the application comprises at least one of clicking a user interface button, entering text into a text-input location, or a duration of time spent on a page.

10. A computer program product comprising one or more computer readable storage media, and program instructions collectively stored on the one or more computer readable storage media, the program instructions executable by a processor to cause the processor to perform operations comprising:
establishing an interaction database based at least in part on interaction data received from an application, the interaction data representative of user engagement with a set of features of the application;
measuring user engagement with each feature of the set of features;
calculating a familiarity score for each feature of the set of features based at least in part on measured user engagement;

constructing a subset of features of the set of features, wherein the subset of features is characterized by low familiarity score;

generating at least one recommendation to utilize at least one feature of the subset of features;

assessing a focal state of a user based on a focal state indicator metric; and displaying the recommendation on a user device at an optimal time, wherein the optimal time is based at least in part on the focal state of the user.

11. The computer program product of claim 10, wherein the stored program instructions are stored in a computer readable storage device in a data processing system, and wherein the stored program instructions are transferred over a network from a remote data processing system.

12. The computer program product of claim 10, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

13. The computer program product of claim 10, further comprising constructing a hierarchical list containing an ordered listing of each feature of the set of features based on relative usage frequency, and wherein constructing a subset of features of the set of features characterized by low usage frequency is based at least in part on the hierarchical list.

14. The computer program product claim 10, further comprising removing an irrelevant feature from the subset of features.

15. The computer program product of claim 10, wherein the recommendation comprises a visual cue corresponding to the at least one feature of the subset of features.

16. The computer program product of claim 10, wherein the recommendation comprises a pop-up notification.

17. A computer system comprising a processor and one or more computer readable storage media, and program instructions collectively stored on the one or more computer readable storage media, the program instructions executable by the processor to cause the processor to perform operations comprising:

establishing an interaction database based at least in part on interaction data received from an application, the interaction data representative of user engagement with a set of features of the application;

measuring user engagement with each feature of the set of features;

calculating a familiarity score for each feature of the set of features based at least in part on measured user engagement;

constructing a subset of features of the set of features, wherein the subset of features is characterized by low familiarity score;

generating at least one recommendation to utilize at least one feature of the subset of features;

assessing a focal state of a user based on a focal state indicator metric; and displaying the recommendation on a user device at an optimal time, wherein the optimal time is based at least in part on the focal state of the user.

18. The computer system of claim 17, wherein measuring user engagement with each feature of the set of features is accomplished via a task mining technique.

19. The computer system of claim 17, wherein the constructing a subset of features of the set of features comprises comparing the familiarity score for each feature of the set of features against a threshold familiarity score, and classifying any feature that does not meet the threshold familiarity score as a low familiarity score feature.

20. The computer system of claim 17, wherein the recommendation comprises at least one of a visual cue corresponding to the at least one feature of the subset of features, a pop-up notification, or a tutorial instructing how to use the least one feature of the subset of features.

\* \* \* \* \*